United States Patent
Arbel et al.

(10) Patent No.: US 8,417,507 B2
(45) Date of Patent: *Apr. 9, 2013

(54) FORMAL VERIFICATION OF MODELS USING CONCURRENT MODEL-REDUCTION AND MODEL-CHECKING

(75) Inventors: Eli Arbel, Midgal Haemek (IL); Shaked Flur, Misgav (IL); Ziv Nevo, Yokneam (IL); Michael Shamis, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,329

(22) Filed: Apr. 18, 2012

(65) Prior Publication Data

US 2012/0203535 A1   Aug. 9, 2012

Related U.S. Application Data

(63) Continuation of application No. 12/164,144, filed on Jun. 30, 2008, now Pat. No. 8,244,516.

(51) Int. Cl.
| | |
|---|---|
| G06F 7/60 | (2006.01) |
| G06F 17/50 | (2006.01) |
| G06F 9/44 | (2006.01) |
| G06F 9/45 | (2006.01) |

(52) U.S. Cl. .................. 703/22; 703/2; 703/13; 703/20
(58) Field of Classification Search ................ 703/2, 13, 703/20, 22

See application file for complete search history.

(56) References Cited

U.S. PATENT DOCUMENTS

| | | | | |
|---|---|---|---|---|
| 5,465,216 | A * | 11/1995 | Rotem et al. | 716/103 |
| 6,209,120 | B1 * | 3/2001 | Kurshan et al. | 716/102 |
| 6,295,515 | B1 * | 9/2001 | Kurshan et al. | 703/13 |
| 6,408,262 | B1 * | 6/2002 | Leerberg et al. | 703/2 |
| 6,643,827 | B1 | 11/2003 | Yang | |
| 7,203,917 | B2 | 4/2007 | Ganai et al. | |
| 7,281,225 | B2 | 10/2007 | Jain et al. | |
| 7,650,595 | B2 * | 1/2010 | Qadeer et al. | 717/127 |
| 8,244,516 | B2 * | 8/2012 | Arbel et al. | 703/22 |

* cited by examiner

*Primary Examiner* — Omar Fernandez Rivas
*Assistant Examiner* — Nithya Janakiraman (57) ABSTRACT

Formal verification of models using concurrent model-reduction and model-checking. For example, a system for formal verification of models includes: one or more model reducers to reduce a model; one or more model checkers to check the model, wherein at least one of the model reducers is to run concurrently with at least one of the model checkers; and a model synchronizer to synchronize information between at least one of the model reducers and at least one of the model checkers.

18 Claims, 3 Drawing Sheets

FORMAL VERIFICATION OF MODELS USING CONCURRENT MODEL-REDUCTION AND MODEL-CHECKING

CROSS-REFERENCE TO RELATED APPLICATIONS

This application is a continuation and claims the benefit of U.S. non-provisional Application No. 12/164,144 filed Jun. 30, 2008, now U.S. Patent No. 8,244,516, which is hereby incorporated by reference in its entirety.

FIELD

Some embodiments are related to the field of formal verification.

BACKGROUND

Some computing systems may be used for formal verification, for example, proving or disproving the correctness of an intended algorithm underlying a hardware and/or software system with respect to a formal specification or properties. Formal verification may be performed, for example, using a Model Checking Algorithm (MCA) which checks substantially all states and transitions in an abstract model of the system.

Some models may be very large, and may include hundreds of thousands of elements. Checking a large model may be time consuming and may require significant computational resources (e.g., processing resources and/or memory resources). Therefore, a Model-Reduction Algorithm (MRA) may be used prior to model checking, in order to reduce the size and/or the complexity of the model to be checked. The output of the MRA may be a reduced model, having the same functionality yet decreased size and/or complexity.

Unfortunately, running a MRA may be time consuming and may require significant computational resources. Accordingly, there is a trade-off between running a MRA to reduce the model and running a MCA to check the model, since longer model-reduction may, or may not, lead to shorter model-checking. Therefore, efforts are being made by users of formal verification systems reduce the total time of both model-checking and model-reduction algorithms, for example, by speculating whether or not it would be beneficial (e.g., time-saving) to run one or more MRAs prior to running a MCA. However, the user may not be able to determine how much time to allocate to model reduction prior to commencing the model checking. For example, it may not necessarily be beneficial to execute a MRA for a long period of time, or to execute multiple MRAs, unless such MRA(s) will result in significant savings of resources for the overall formal verification process.

In particular, it may be difficult to predict in advance the effectiveness of a MRA; for example, in some cases, a long runtime of a particular MRA may not justify the relatively small reduction in model size or complexity, and thus may not reduce the MCA runtime, and may even increase the overall formal verification runtime. Additionally, in some cases, it may not be beneficial to execute a MRA because a particular model may be checked relatively quickly without, or with minimal, model reduction efforts.

Some computing systems may utilize transformation-based formal verification, in which model reduction and model checking are interleaved. For example, in some systems, a basic MRA may be initially executed; upon termination of the execution of the MRA, one or more MCAs may be executed; if the one or more MCAs fail to provide a solution to all problems in the partially-reduced model, then, upon the termination of the execution of these MCAs, an advanced (e.g., computationally intensive) MRA is executed, in an attempt to further reduce the model. Upon the termination of the execution of the advanced MRA, one or more MCAs may be executed; and so forth. The model reduction efforts may be repeatedly escalated, interleaved with the model checking efforts, until the model is formally verified. In other computing systems, multiple MCAs are executed in parallel, and may be terminated as soon as one of the MCAs verifies the model.

SUMMARY

Some embodiments include, for example, devices, systems, and methods of formal verification utilizing concurrent model-reduction and model-checking.

In some embodiments, for example, a system for formal verification of models includes: one or more model reducers to reduce a model; one or more model checkers to check the model, wherein at least one of the model reducers is to run concurrently with at least one of the model checkers; and a model synchronizer to synchronize information between at least one of the model reducers and at least one of the model checkers.

In some embodiments, for example, a method for formal verification of models includes: concurrently running on a model one or more model reducers and one or more model checkers; and synchronizing information between at least one of the model reducers and at least one of the model checkers.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments of the invention. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, the phrase "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a software-based and/or hardware-based system, or the like.

The term "model" as used herein includes, for example, an abstract representation of a software-based and/or hardware-based system and/or an Integrated Circuit (IC); a structure or description represented using a Hardware Description Language (HDL) (e.g., VHDL or Verilog); a structure corresponding to a Finite State Machine (FSM), e.g., utilizing a directed graph of edges and nodes or vertices which represent states, possible transitions, and atomic propositions; or other suitable structures or representations.

The terms "Model Checking Algorithm", "MCA", and "model checker" as used herein include, for example, an algorithm or module able to check whether or not a model corresponds to a formal specification; an algorithm or module able to check substantially all states and transitions in a model; an algorithm or module able to check substantially all memory elements in a model; a symbolic algorithm or module able to utilize Binary Decision Diagrams (BDDs); an algorithm or module able to perform reachability analysis; or other suitable algorithms or modules.

The term "Model-Reduction Algorithm", "MRA", and "model reducer" as used herein include, for example, an algorithm or module able to reduce a size of a model, able to reduce complexity of a model, able to reduce the number of elements of a model, and/or able to reduce the state space corresponding to a model; an algorithm or module able to find and/or eliminate redundant elements in a model; an algorithm or module able to find and/or eliminate invariants in a model; or other suitable algorithms or modules. In some embodiments, for example, a MRA may perform irrelevant logic elimination, e.g., using "cone of influence" algorithms, in order to remove from the model logic which does not affect the model checking results. In some embodiments, for example, a MRA may replace logic with constants, e.g., using "constant propagation" algorithms in order to identify gates and memory elements which retain constant values along every possible execution path; such identified logic is replaced with the corresponding constant(s). In some embodiments, for example, a MRA may eliminate duplicate logic, e.g., using "BDD sweeping" algorithms in order to identify two or more pieces of logic having identical functionality; only one copy is then maintained, and is connected to other places to which the other copies were previously connected. In some embodiments, for example, a MRA may rewrite logic, e.g., using "retiming" algorithms in order to rewrite parts of the logic using a new, smaller, set of memory elements, while keeping functional equivalence. Other suitable MRAs may be used.

The term "concurrent" as used herein with regards to two or more processes or algorithms includes and relates to, for example, execution of two or more processes or algorithms concurrently; substantially concurrently; contemporaneously; entirely or partially in parallel; simultaneously; substantially simultaneously; at a common time window or time frame; at two or more time frames or time window that at least partially overlap or coincide; or the like. In some embodiments, a first process is "concurrent" or "concurrently running" with a second process, for example, if there is at least one time-point in which both processes are running; if the first process begins while the second process is running, or vice versa; if the first process ends while the second process is running; if neither the first and second processes end before the other process starts; or if the execution of the processes otherwise overlaps in the time domain.

As an overview, some embodiments include devices, systems, and methods of formal verification. In some embodiments, one or more MRAs are executed simultaneously, concurrently, in parallel with, or in a common or overlapping time-frame, with one or more MCAs, with respect to a common model. In some embodiments, a model is thus subject to simultaneous, concurrent, or at least partially-concurrent model reduction and model checking.

In some embodiments, one or more MRAs share information with concurrently-running one or more MCAs; and/or one or more MCAs share information with concurrently-running one or more MRAs. In some embodiments, one or more MRAs receive information in substantially real-time from concurrently-running one or more MCAs; and/or one or more MCAs receive information in substantially real-time from concurrently-running one or more MRAs. The concurrent operation of the MCA(s) and MRA(s) may be managed using a model synchronizer, which manages the flow of information and synchronizes the concurrent execution of the MRA(s) and MCA(s), allowing controlled and/or efficient information exchange and information sharing between the two classes of algorithms, namely, the MCA(s) and the MRA(s).

In some embodiments, model reduction information (e.g., model invariants) is periodically and/or occasionally broadcast by the MRA(s) to the model synchronizer and/or to the MCA(s), thereby allowing the MCA(s) to simplify the problem(s) being checked by the MCA(s). In some embodiments, simplified models or reduced models generated by the MRA(s) periodically and/or occasionally replace a previous version (e.g., non-reduced or less reduced) of the model being checked by the MCA(s); the replacement may be performed by the model synchronizer. In some embodiments, reduction-enabling information from the MCA(s) (e.g., one or more solved sub-problems) is transferred from the MCA(s) to the model synchronizer and is then broadcast by the model synchronizer, for example, to replace, modify or augment previous data used by the MRA(s). The reduction-enabling information from the MCA may create new model-reduction opportunities to the MRA(s), or may allow the MRA(s) to operate more efficiently, more rapidly, or more productively.

Some embodiments may be used in conjunction with various formal verification platforms, and may support parallel execution of multiple algorithms. Some embodiments allow rapid commencement of one or more MCAs, for example, after execution of one or more "basic" (e.g., non-computationally-intensive MRAs) to reduce the model. For example, one or more computationally-intensive MRAs may later update the one or more MCAs, which may then check a reduced or updated version of the model, thereby taking into account in the model-checking reduction that was performed during the concurrent execution of the one or more MCAs.

In some embodiments, the execution of one or more MRAs concurrently with one or more MCAs may be advantageous, for example, compared to serial execution in which a MCA is executed only after termination of MRA execution; or compared to interleaved execution of a MRA and a MCA.

Figure 1:
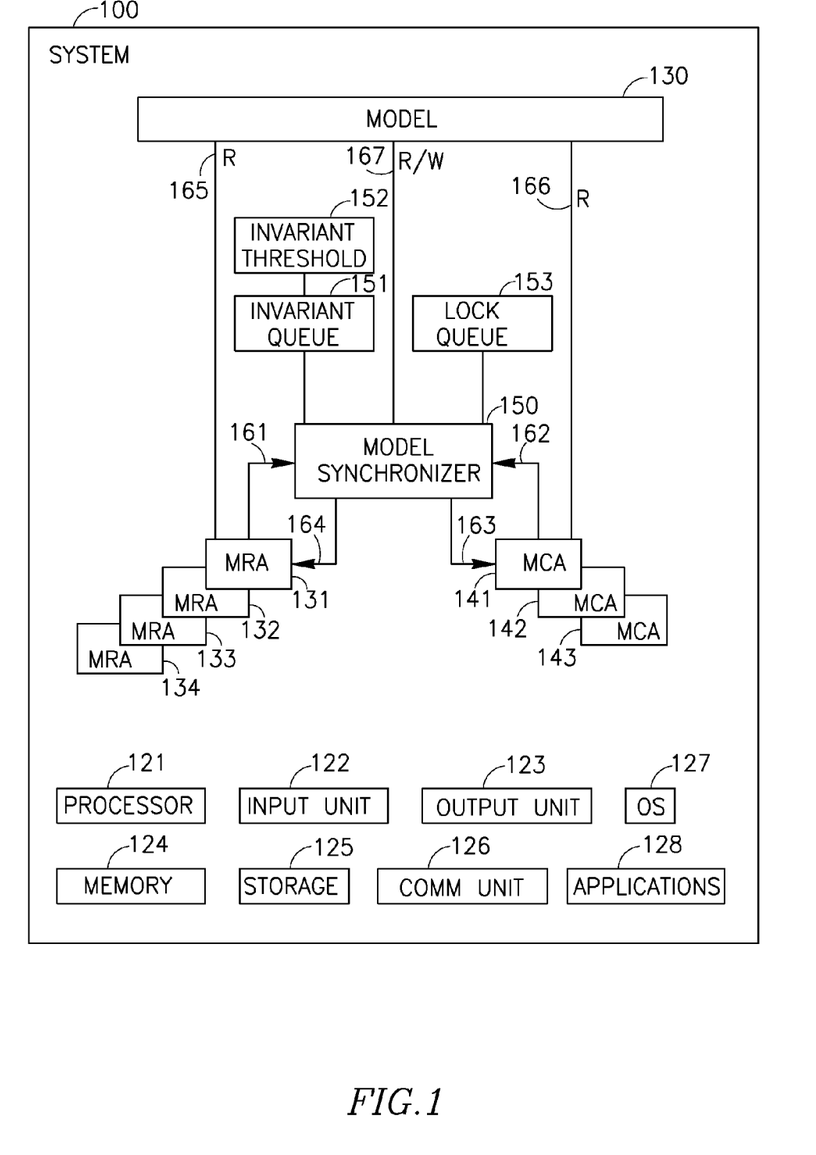
FIG. 1 is a schematic block diagram illustration of a formal verification system in accordance with some demonstrative embodiments of the invention.

FIG. 1 schematically illustrates a block diagram of a formal verification system 100 in accordance with some demonstrative embodiments of the invention. In some embodiments, system 100 is implemented as a computer, a computing device, a computing station, or other computing platform having one or more computing units. In some embodiments, the components of system 100 may be enclosed in a common housing or packaging (e.g., a computing device or computer). In other embodiments, the components of system 100 may be included in multiple, separate, devices or units; may be distributed; and/or may be located in multiple sites. In some embodiments, system 100 may utilize client/server architecture, publisher/subscriber architecture, fully centralized architecture, partially centralized architecture, fully distributed architecture, partially distributed architecture, scalable or non-scalable Peer to Peer (P2P) architecture, or other suitable architectures or combinations thereof.

System 100 includes suitable hardware components and/or software components, for example, a processor 121, an input unit 122, an output unit 123, a memory unit 124, a storage unit 125, and a communication unit 126. In some embodiments, system 100 is implemented as a formal verification station, for example, similar to a computer system utilizing IBM's RuleBase PE formal verification tool. Other suitable hardware and/or software components may be used.

Processor 121 includes, for example, a Central Processing Unit (CPU), a Digital Signal Processor (DSP), one or more processors or processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor(s) or controller(s). Processor 121 executes instructions, for example, of an Operating System (OS) 127 or of one or more applications 128.

Input unit 122 includes, for example, a keyboard, a keypad, a mouse, a touch-pad, a touch-screen, a joystick, a track-ball, a stylus, a microphone, or other suitable pointing unit or input device. Output unit 123 includes, for example, a monitor, a screen, a touch-screen, a Cathode Ray Tube (CRT) display unit, a Liquid Crystal Display (LCD) display unit, a plasma display unit, one or more audio speakers or earphones, or other suitable output devices.

Memory unit 124 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 125 includes, for example, a hard disk drive, a floppy disk drive, a Compact Disk (CD) drive, a CD-ROM drive, a Digital Versatile Disk (DVD) drive, an electro-optical drive, an internal or external database or repository, or other suitable removable or non-removable storage units. Memory unit 124 and/or storage unit 125, for example, store data processed by server 120.

Communication unit 126 includes, for example, a wired or wireless transceiver, a wired or wireless modem, a wired or wireless Network Interface Card (NIC), or other unit suitable for transmitting and/or receiving communication signals, blocks, frames, transmission streams, packets, messages and/or data. Optionally, communication unit 126 includes, or is associated with, one or more antennas or one or more sets of antennas.

System 100 is utilized for formal verification of a model 130 using one or more MRAs and one or more concurrently-running MCAs. For example, system 100 includes four MRAs 131-134 and three MCAs 141-143. Other suitable numbers of MRAs and/or MCAs may be used.

System 100 further includes a model synchronizer 150, allowing flow management and synchronization, as well as information exchange and information sharing between the two classes of algorithms, namely, the MCAs 141-143 and the MRAs 131-134.

Some embodiments allow a formal verification process utilizing parallel or concurrent execution of one of more MCAs 141-143 and one or more MRAs 131-134. In some embodiments, one or more MCAs 141-143 are launched (e.g., manually or automatically) after a pre-defined model-reduction effort is performed, and without waiting for computational-intensive or CPU-intensive MRA(s) 131-134 to first terminate execution. In some embodiments, one or more MRAs 131-134 may be executed without pre-defining an model-reduction execution time period, since the one or more MCAs 141-143 are not required to wait for model-reduction termination in order to commence model-checking. This allows, for example, thorough execution of the one or more MRAs 131-134, and/or utilization of computationally-intensive MRAs 131-134, without delaying the commencement of execution of the one or more MCAs 141-143.

In some embodiments, model-reduction information is generated by the MRAs 131-134 while at least one or more of the MCAs 141-143 are running. The model-reduction information is dynamically transferred from the MRAs 131-134 to the model synchronizer 150, which occasionally or periodically broadcasts the information to the MCAs 141-143. In some embodiments, the model synchronizer 150 may broadcast the model-reduction information to the MCAs 141-143 periodically (e.g., at pre-defined time intervals), and/or when a minimum threshold amount of model-reduction information accumulates. In some embodiments, additionally or alternatively, the model synchronizer 150 may rewrite the model 130 and/or may replace the model 130 with an updated, reduced, model based on the model-reduction information generated dynamically by the MRAs 131-134; and the model synchronizer 150 may command the MCAs 141-143 to perform, or to continue to perform, model checking on the updated or reduced version of model 130, instead of the original version or the previous version of model 130. In some embodiments, MCAs 141-143 may perform model checking on an updated or reduced version of the model 130, thereby compensating for a model-reduction that was optionally skipped initially upon launching of the MCAs 141-143. In some embodiments, modification or updating of the model 130 based on model-reduction information, and/or replacement of the model 130 with a reduced model, may be performed by the model synchronizer 150; in other embodiments, these operations may be performed by the MRA(s) 131-134, and the model synchronizer 150 may handle the locking of the model 130 prior to model update or model replacement and/or the unlocking of the model 130 subsequent to model update or model replacement.

In some embodiments, model-checking information is generated by the MCAs 141-143 while at least one or more of the MRAs 131-134 are running. The model-checking information is dynamically transferred from the MCAs 141-143 to the model synchronizer 150, which occasionally or periodically broadcasts the information to the MRAs 131-134. In some embodiments, the model synchronizer 150 may broadcast the model-checking information to the MRAs 131-134 periodically (e.g., at pre-defined time intervals), and/or when a minimum threshold amount of model-checking information accumulates. In some embodiments, additionally or alternatively, the model synchronizer 150 may rewrite the model 130 and/or may replace the model 130 with an updated, reduced, model based on the model-checking information generated dynamically by the MCAs 141-143; and the model synchronizer 150 may command the MRAs 131-134 to perform, or to continue to perform, model reduction on the updated or reduced version of model 130, instead of the original version or the previous version of model 130. This may allow the MRAs 131-134 to use dynamically-generated model-checking information, produced by the MCAs 141-143, in order to guide the model-reduction efforts and/or to produce new model-reduction opportunities.

In some embodiments, the model synchronizer 150 handles substantially all communication and synchronization between MCAs 141-143 and MRAs 131-134. For example, communications between the MCAs 141-143 and the MRAs 131-134 passes exclusively through the model synchronizer, thereby allowing the MCAs 141-143 and the MRAs 131-134 to run substantially independently. In some embodiments, such communication includes, for example, invariants found by the MRAs 131-134, which are then used by MCAs 141-143 in order to further simplify the model 130 being checked and thus improve performance. In some embodiments, the communication includes, for example, synchronization performed directly on the file representing the model 130, which is available for both the MRAs 131-134 and the MCAs 141-143; the synchronization includes, for example, support for reading the model 130 by all the algorithms (namely, by both the MRAs 131-134 and the MCAs 141-143), as well as support for updating the model (e.g., only the MRAs 131-134 are authorized to write a more reduced model 130). In some embodiments, the model synchronizer 150 may utilize one or more locks, access authorization mechanisms, or access permission mechanisms, in order to selectively lock the model 130 from being read by MCAs 141-143 while the MRAs 131-134 are writing, modifying or updating a reduced version of the model 130. In some embodiments, the model synchronizer 150 may utilize one or more locks, access authorization mechanisms, or access permission mechanisms, in order to prevent two or more of the MRAs 131-134 from simultaneously modifying the model 130, simultaneously replacing the model 130 based on model-reduction information, and/or simultaneously performing a write operation to the model 130 to reflect model-reduction information.

In some embodiments, the MRAs 131-134 operate in order to simplify and/or shorten the task of the MCAs 141-143, by reducing the size of the model 130. During runtime, the MRAs 131-134 produce one or more types of output, which is distributed or broadcast through the model synchronizer 150 to the MCAs 141-143. For example, in some embodiments, the MRAs 131-134 perform model-reduction operations which result in a writing of a reduced model, replacing the original model 130 (or a previous version thereof); and the MCAs 141-143 re-read substantially the entire reduced model 130 having the reduced size. Additionally or alternatively, the MRAs 131-134 perform model-reduction efforts operations that result in reduction invariants, which are applied on the existing version of the model 130 to reduce it, without necessarily re-writing the entire model 130 and/or re-reading the entire model 130.

In some embodiments, the model synchronizer further manages the transfer of model-checking information, generated dynamically by the MCAs 141-143, to the MRAs 131-134. This may allow the MRAs 131-134 to efficiently reduce the model 130 by taking into account dynamically-generated model-checking information. For example, solved assertions are dynamically generated by the MCAs 141-143, are transferred through the model synchronizer 150 to the MRAs 131-134, and may be utilized by the MRAs 131-134 as invariants (e.g., depending on the validity of solved assertions, and/or on the model-reduction algorithm used by a particular MRA); these operations may be performed while at least one of the MRAs 131-134 is running. In some embodiments, for example, the MCAs 141-143 dynamically generate suspected invariants, which are then transferred through the model synchronizer 150 to the MRAs 131-134; and the MRAs 131-134 may attempt to prove the suspected invariants; these operations may be performed while at least one of the MRAs 131-134 is running.

For demonstrative purposes, links 161-167 are shown in order to represent connection and/or communication among components. For example, link 161 represents transfer of model-reduction information (e.g., invariants, or representation of a reduced model) from the MRAs 131-134 to the model synchronizer 150. Link 162 represents transfer of model-checking information (e.g., solved assertions, or suspected invariants) from the MCAs 141-143 to the model synchronizer 150. Link 163 represents transfer of model-reduction information (e.g., invariants, or representation of a reduced model) from the model synchronizer 150 to the MCAs 141-143. Link 164 represents transfer of model-checking information (e.g., solved assertions, or suspected invariants) from the model synchronizer 150 to the MRAs 131-134. Link 165 represents that MRAs 131-134 may have a read access to model 130; link 166 represents that MCAs 141-143 may have a read access to model 130; whereas link 167 represents that the model synchronizer 150 may have both read and write access to model 130, e.g., in order to modify and/or rewrite the model 130. In some embodiments, one or more locking mechanisms may be used (e.g., in relation to links 165-167) to allow the model synchronizer 150 to manage read privileges and/or write privileges of the MRAs 131-134 and/or the MCAs 141-143 with respect to the model 130.

In some embodiments, the model synchronizer 150 operates in accordance with an algorithm. For example, while a problem associated with the model 130 is unsolved, the model synchronizer 150 awaits for incoming information items (e.g., packets, or other type of data items) received from MRAs 131-134 and/or from MCAs 141-143. Upon receiving an information item, or a set of information items, the model synchronizer 150 operates based on the type of information items received.

For example, if the received information item is a packet representing a new reduced model (e.g., generated by one or more of the MRAs 131-134), then the new reduced model packet is broadcast by the model synchronizer 150 to substantially all the MCAs 141-143.

Alternatively, for example, if the received information item is a packet representing a new invariant (e.g., generated by one or more of the MRAs 131-134), then the model synchronizer 150 handles the packet based on whether or not the size of an invariant queue 151 is greater than an invariant threshold value 152. For example, if the size of the invariant queue 151 is not greater than the invariant threshold value, then the model synchronizer 150 adds the newly received invariant to the invariant queue 151. In contrast, if the size of the invariant queue 151 is greater than the invariant threshold value 152, then the model synchronizer 150 sends, to substantially all the MCAs 141-143, all the invariant accumulated in the invariant queue 151, as well as the newly received invariant; and the model synchronizer 150 empties or resets the invariant queue 151. In some embodiments, the invariant queue 151 may be optional or may not be utilized; for example, substantially each model-reduction information item may be published to the MCAs 141-143, substantially without delays or without placement in a queue. In other embodiments, the invariant queue 151 may be utilized, for example, in order to reduce communication overhead, and/or in order to replace many publications of single invariants with fewer publications of groups of invariants, thereby optionally contributing to a smoother and less interrupted operation of the MCAs 141-143.

Alternatively, for example, if the received information item is a packet representing a solution to a sub-problem of the model 130 (e.g., received from one of the MCAs 141-143), then the sub-problem solution is broadcast by the model synchronizer 150 to substantially all the MCAs 141-143 and to substantially all the MRAs 131-134.

Alternatively, for example, if the received information item is a packet representing a request to obtain a lock on the model 130, then the model synchronizer 150 handles the packet based on the current lock status of the model 130. For example, if the model 130 is locked, then a lock request is added by the model synchronizer 150 to a lock queue 153. In contrast, if the model 130 is not locked, then the model synchronizer 150 responds to the lock requester by sending a packet representing that a model lock is acquired, and the model synchronizer 150 marks the model 130 as locked.

Alternatively, for example, if the received information item is a packet representing a request to release a lock on the model 130, then the model synchronizer 150 handles the packet based on the current lock status of the lock queue 153. For example, if the lock queue 153 is empty, then the model synchronizer 150 marks the model 130 as unlocked. In contrast, if the lock queue 153 is not empty, then the model synchronizer 150 sends to the first requester in the lock queue 153 a packet representing that a model lock is acquired; and the first requester is removed, by the model synchronizer 150, from the lock queue 153.

In some embodiments, other types of locking mechanisms may be used. For example, some locking mechanisms distinguish between read-locks and write-locks. The write-locks ensure that no component (MCA and/or MRA) is able to read the model 130 or to write to the model 130; whereas the read-locks are utilized to allow multiple components (MCAs and/or MRAs) to access the model 130 for reading. Some embodiments utilize a mechanism to identify and/or handle process failure, thereby preventing a situation in which a "dead" or non-operational process holds and delays operational processes, by not releasing a lock on the model 130; for example, process status may be monitored, and/or communication-channel status may be monitored, in order to identify and/or handle process failure.

Figure 2:
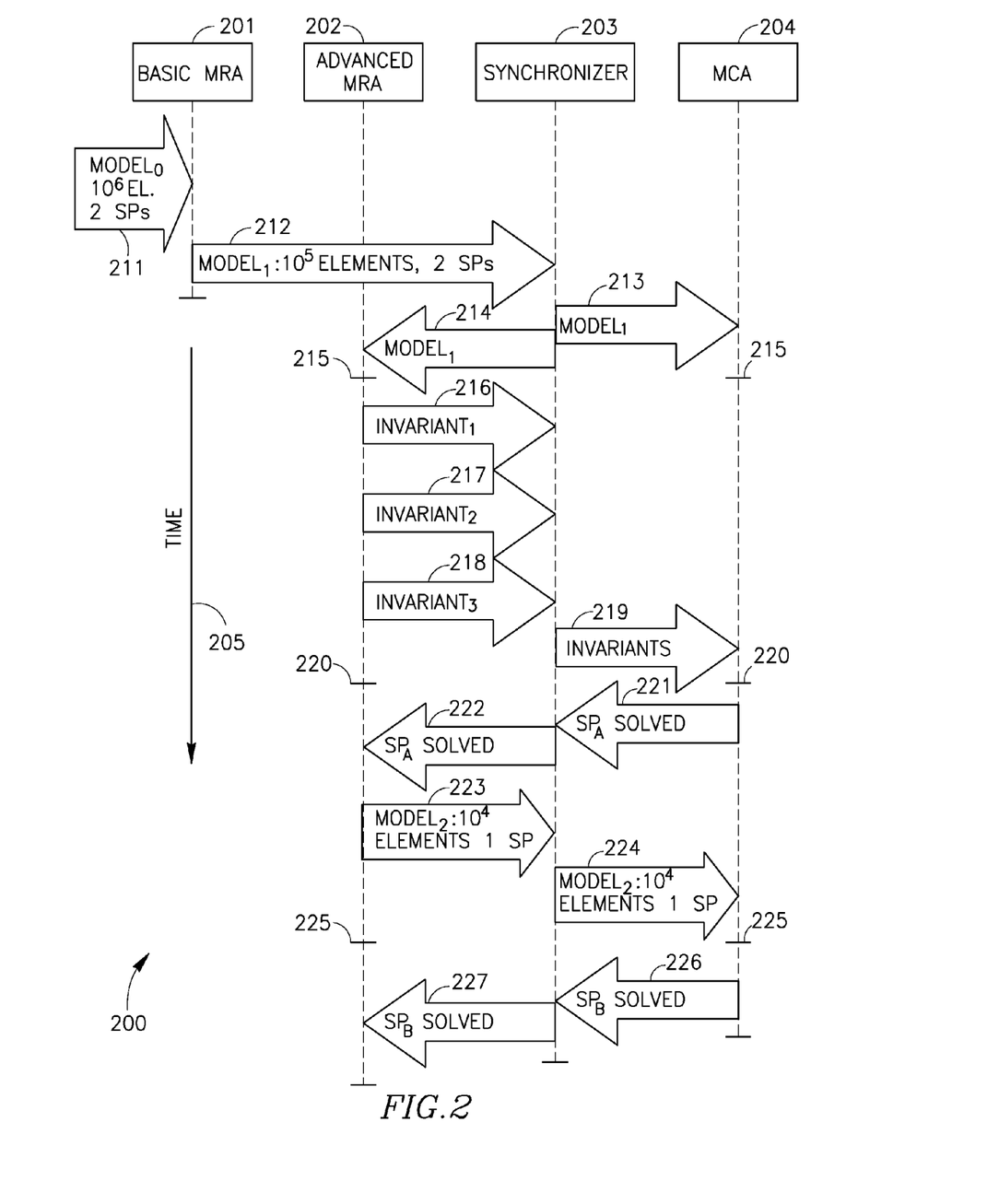
FIG. 2 is a schematic block diagram illustration of a timing scheme of an operation of a formal verification system in accordance with some demonstrative embodiments of the invention.

FIG. 2 schematically illustrates a block diagram of a timing scheme 200 of an operation of a formal verification system in accordance with some demonstrative embodiments of the invention. Timing scheme 2 may be associated, for example, with system 100 of FIG. 1 or with other suitable formal verification systems. For demonstrative purposes, timing scheme 200 is associated with a formal verification system which includes, for example, a basic MRA (e.g., a MRA which is non-computational-intensive), represented in column 201; a non-basic or advanced MRA (e.g., a MRA which is computational-intensive), represented in column 202; a model synchronizer, represented in column 203; and a MCA, represented in column 203. A vertical axis 205 represents time, such that an operation that is located lower on the vertical axis 205 occurs after subsequent to an operation that is located higher on the vertical axis 205.

As indicated by arrow 211, an initial model is received by the basic MRA. The initial model is denoted $Model_0$, and includes, for example, 1,000,000 elements and two Sub-Problems (SPs). The basic MRA performs basic (e.g., rapid, or non-computational-intensive) model reduction, and reduces the initial model $Model_0$ into a reduced model, denoted $Model_1$, which includes 100,000 elements and two SPs.

As indicated by arrow 212, upon termination of the model-reduction by the basic MRA, the reduced model $Model_1$ is transferred from the basic MRA to the model synchronizer. Then, the reduced model $Model_1$ is transferred or broadcast from the model synchronizer to the MCA (arrow 213) and to the advanced MRA (arrow 214). At time-point 215, the MCA performs model-checking on the reduced model $Model_1$, and in parallel the advanced MRA performs model-reduction on the reduced model $Model_1$.

As indicated by arrow 216, while the MCA performs model-checking on the reduced model $Model_1$, the advanced MRA finds a first invariant of this model, denoted Invariant1, and transfers the first invariant to the model synchronizer. The model synchronizer does not yet publish or broadcast the found first invariant to the concurrently-running MCA; for example, because an accumulated number of found invariants is smaller than a pre-defined threshold value.

As indicated by arrow 217, while the MCA performs model-checking on the reduced model $Model_1$, the advanced MRA finds a second invariant of this model, denoted Invariant2, and transfers the second invariant to the model synchronizer. The model synchronizer does not yet publish or broadcast the found second invariant to the concurrently-running MCA; for example, because an accumulated number of found invariants is still smaller than a pre-defined threshold value.

As indicated by arrow 218, while the MCA performs model-checking on the reduced model $Model_1$, the advanced MRA finds a third invariant of this model, denoted Invariant3, and transfers the third invariant to the model synchronizer. The accumulated number of found invariants (three) is now not smaller than a pre-defined threshold value (e.g., three). Therefore, as indicated by arrow 219, the model synchronizer publishes or broadcasts to the concurrently-running MCA all the accumulated or queued invariants (namely, Invariant1, Invariant2, and Invariant3).

At time point 220, the MCA and the advanced MRA continue to run in parallel. While the advanced MRA performs model-reduction on the reduced model $Model_1$, the MCA solves a first SP, denoted $SP_A$. For example, the MCA solves the $SP_A$ by utilizing one or more of the three invariants that the advanced MRA found and that were received by the MCA from the model synchronizer.

As indicated by arrow 221, the solved SP is transferred from the MCA to the model synchronizer, while the advanced MRA continues to perform model-reduction. As indicated by arrow 222, the solved SP is published or broadcast by the model synchronizer to the advanced MRA, while both the MRA and the MCA are running. The advanced MRA is now able to utilize the solved SP in the model-reduction efforts.

Subsequently, while the MCA is still running in parallel, the advanced MRA reduces the model ($Model_1$) into a further-reduced model, denoted $Model_2$, having 10,000 elements and only one SP. For example, the significant reduction of the model was performed the advanced MRA by taking into account the solved $SP_A$, received from the model synchronizer. As indicated by arrow 223, the further-reduced model $Model_2$ is transferred from the advanced MRA to the model synchronizer.

As indicated by arrow 224, the model synchronizer publishes or broadcasts the further-reduced model $Model_2$ to the MCA, or re-writes or replaces the previous version of the model ($Model_1$) with the further-reduced version ($Model_2$). It is noted that in some embodiments, model modification based on model-reduction information, and/or model replacement based on model-reduction information, may be performed by the MRA, and the model synchronizer may handle the locking and unlocking of the model to allow such model update or model replacement. At time point 225, the MCA performs model-checking on the further-reduced model $Model_2$, and in parallel the advanced MRA performs model-reduction on the further reduced model $Model_2$.

While the advanced MRA performs model-reduction on the further-reduced model $Model_2$, the MCA solves a second SP, denoted $SP_B$. For example, receiving the further-reduced model $Model_2$ instead of the previous version of the model ($Model1$) allowed the MCA to solve the $SP_B$.

As indicated by arrow 226, the solved SP is transferred from the MCA to the model synchronizer, while the advanced MRA continues to perform model-reduction. As indicated by arrow 227, the solved SP is published or broadcast by the model synchronizer to the advanced MRA, while both the MRA and the MCA are running.

Timing scheme 200 is shown for demonstrative purposes, and other suitable timing schemes may be used. Timing scheme 200 does not reflect, for example, transfer of locking or unlocking requests or acquisitions, or other locking/unlocking packets or communication.

Figure 3:
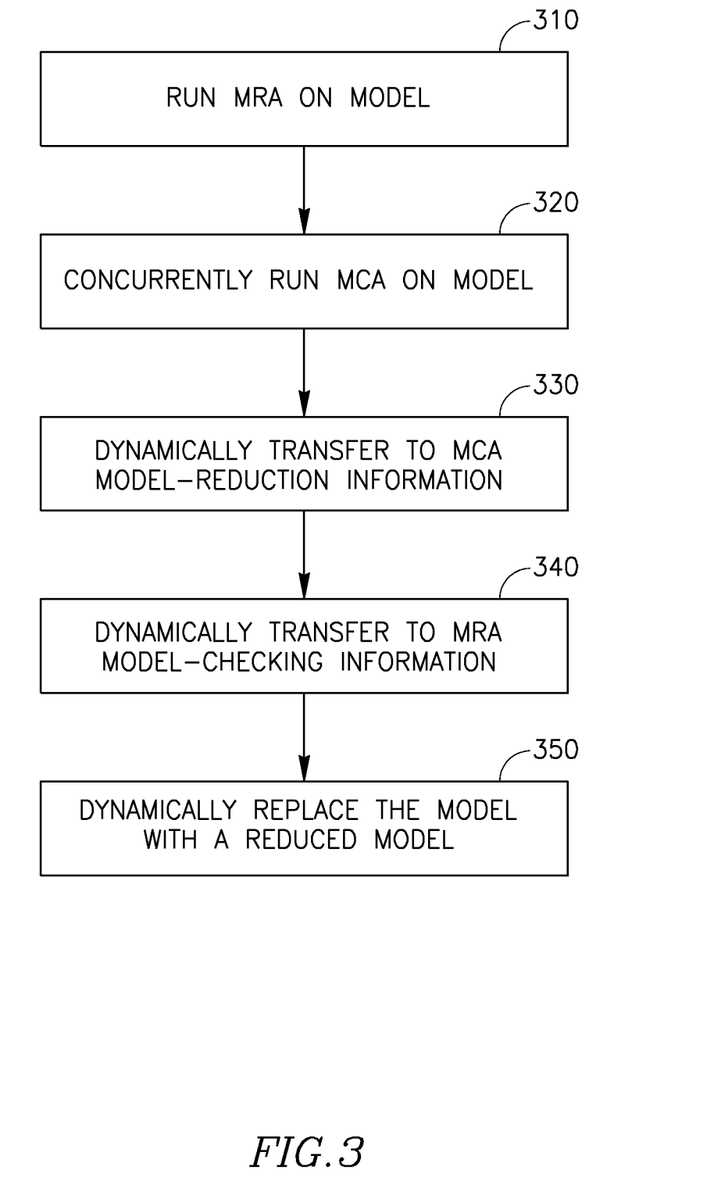
FIG. 3 is a schematic flow-chart of a method of formal verification, in accordance with some demonstrative embodiments of the invention.

FIG. 3 is schematic flow-chart of a method of formal verification, in accordance with some demonstrative embodiments of the invention. Operations of the method may be used, for example, by system 100 of FIG. 1, and/or by other suitable units, devices and/or systems.

In some embodiments, the method may include, for example, running a MRA on a model (block 310).

In some embodiments, the method may include, for example, concurrently running a MCA on the model while the MRA is running on the model (block 320).

In some embodiments, the method may include, for example, transferring to the MCA, while the MCA is running, model-reduction information (e.g., invariant(s), reduced model, model modification(s), replacement model, or other output) generated by the concurrently-running MRA (block 330). For example, the model-reduction information is utilized by the MCA for further model checking.

In some embodiments, the method may include, for example, transferring to the MRA, while the MRA is running, model-checking information (e.g., solved sub-problem(s), suspected invariant(s), or other output) generated by the concurrently-running MCA (block 340). For example, the model-checking information is utilized by the MRA for further model reduction.

In some embodiments, the method may include, for example, replacing the model, while the MCA is running, with a reduced model generated by the MRA (block 350). Optionally, access to the model is locked substantially immediately prior to the replacement, and is unlocked substantially immediately subsequent to the replacement.

Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications and changes.

What is claimed is:

1. A method for performing model checking, the method performed by a computer having a processor and a memory, the method comprising:
concurrently executing, with respect to a model, one or more model reducers and one or more model checkers; and
synchronizing information between a portion of the one or more model checkers and model reducers, thereby improving performance of at least one module without a-priori suspending an operation of the module, wherein the at least one module is selected from the group consisting of the one or more model reducers and the one or more model checkers.

2. The method of claim 1, comprising:
while at least one of the model checkers is being executed, transferring model reduction information from at least one of the model reducers to at least one of the model checkers; and
reducing the model being model checked by the at least one of the model checkers based on the model reduction information.

3. The method of claim 2 wherein the model reduction information comprises one or more invariants determined by the model reducer while at least one of the model checkers is being executed on the model.

4. The method of claim 1 comprising:
while at least one of the model checkers is being executed, replacing the model with a reduced model based on the information received from at least one of the model reducers.

5. The method of claim 1, comprising:
while at least one of the model reducers is being executed, transferring a solved sub-problem from at least one of the model checkers to at least one of the model reducers.

6. The method of claim 1, comprising:
while at least one of the model reducers is being executed, transferring model checking information from at least one of the model checkers to at least one of the model reducers; and
simplifying the model being reduced by the at least one of the model reducers based on the model checking information.

7. The method of claim 6, wherein the model checking information comprises a suspected invariant, which is determined by a model checker after execution of the at least one model reducer commenced.

8. The method of claim 6 wherein the model checking information comprises a solved sub-problem, which is determined by a model checker after execution of the at least one model reducer commenced.

9. The method of claim 1, wherein the model is a functional depiction of an item selected from the group consisting of: a circuit, a hardware-based system and a software-based system.

10. A computerized apparatus having a processor and a memory device, the processor being adapted to perform the steps of:
concurrently executing, with respect to a model, one or more model reducers and one or more model checkers; and
synchronizing information between a portion of the one or more model checkers and model reducers, thereby improving performance of at least one module without a-priori suspending an operation of the module, wherein the at least one module is selected from the group consisting of the one or more model reducers and the one or more model checkers.

11. The computerized apparatus of claim 10, wherein the processor is further adapted to perform the steps of:
while at least one of the model checkers is being executed, transferring model reduction information from at least one of the model reducers to at least one of the model checkers; and
reducing the model being model checked by the at least one of the model checkers based on the model reduction information.

12. The computerized apparatus of claim 11 wherein the model reduction information comprises one or more invariants determined by the model reducer while at least one of the model checkers is being executed on the model.

13. The computerized apparatus of claim 10, wherein the processor is further adapted to perform the steps of:
while at least one of the model checkers is being executed, replacing the model with a reduced model based on the information received from at least one of the model reducers.

14. The computerized apparatus of claim 10, wherein the processor is further adapted to perform the steps of:

while at least one of the model reducers is being executed, transferring a solved sub-problem from at least one of the model checkers to at least one of the model reducers.

15. The computerized apparatus of claim 10, wherein the processor is further adapted to perform the steps of:

while at least one of the model reducers is being executed, transferring model checking information from at least one of the model checkers to at least one of the model reducers; and simplifying the model being reduced by the at least one of the model reducers based on the model checking information.

16. The computerized apparatus of claim 15, wherein the model checking information comprises a suspected invariant, which is determined by a model checker after execution of the at least one model reducer commenced.

17. The computerized apparatus of claim 15, wherein the model checking information comprises a solved sub-problem, which is determined by a model checker after execution of the at least one model reducer commenced.

18. The computerized apparatus of claim 10, wherein the model is a functional depiction of an item selected from the group consisting of: a circuit, a hardware-based system and a software-based system.

* * * * *